Dec. 24, 1940. J. J. ETTINGER 2,226,307
FOLDING LITTER
Filed Sept. 16, 1940
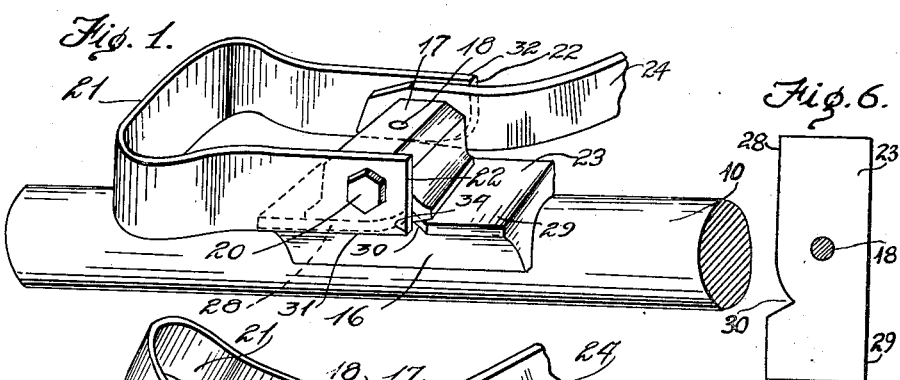
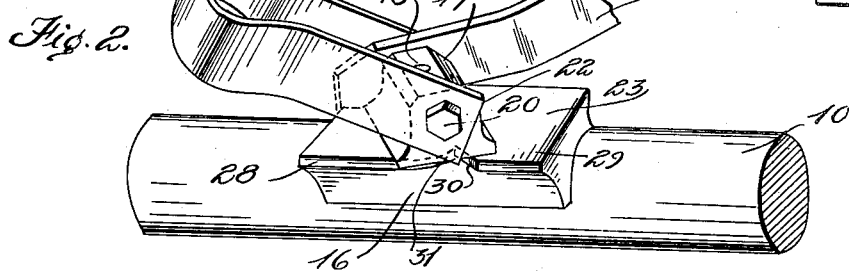
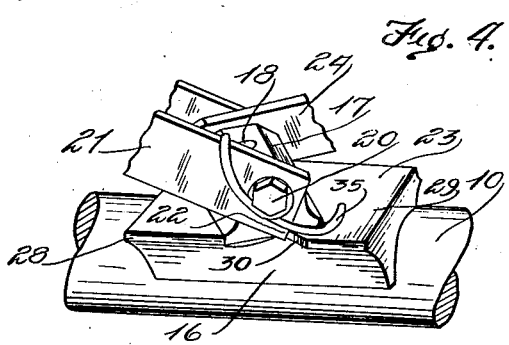
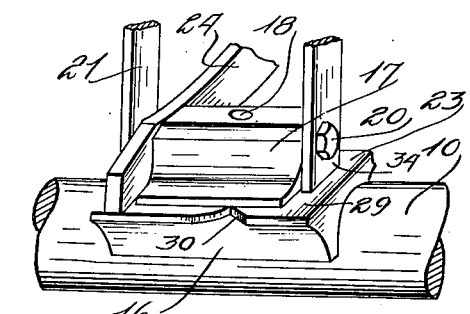
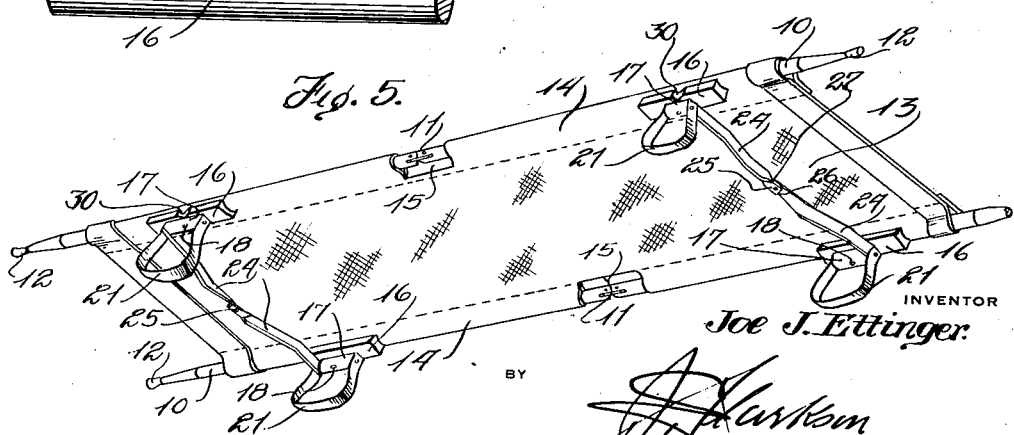
INVENTOR
Joe J. Ettinger.
BY
ATTORNEY Patented Dec. 24, 1940

2,226,307

UNITED STATES PATENT OFFICE 2,226,307

FOLDING LITTER

Joe J. Ettinger, Warsaw, Ind.

Application September 16, 1940, Serial No. 357,062

9 Claims. (Cl. 5—82)

This invention relates to folding litters and has special reference to an improvement of the folding litter shown and described in my co-pending application for patent for Invalid litter, filed August 5, 1940, and bearing the Serial Number 351,489.

In the aforesaid co-pending application was the concept, in general, to provide legs for such a litter so constructed that upon collapse of the litter such legs might each be manually moved between folded and inactive position and active position for supporting the litter when placed on the ground or other supporting surface.

It is the principal object of the present invention to provide a novel construction of a folding or collapsible litter wherein legs will be provided for supporting the litter and which legs will be automatically moved, without manual intervention, into litter supporting position upon opening of the litter.

A further object of the invention is to provide means whereby the legs will automatically collapse when side bars of the litter are moved toward each other.

With the above and other objects in view, the invention consists in general of certain novel details of construction and combinations of parts hereinafter fully described, illustrated in the accompanying drawing and particularly pointed out in the appended claims.

In the accompanying drawing like characters of reference indicate like parts in the several views, and—

Figure 1 is a perspective view of one of the legs of the improved litter in its folded position.

Figure 2 is a similar view with the leg moved partially into position for use.

Figure 3 is a perspective view showing the lower part of the leg when the leg is in full position for use.

Figure 4 illustrates a modification of the invention whereby collapse of the litter will effect folding of the legs on the litter poles.

Figure 5 is a perspective view of a litter provided with the present leg arrangement, the view being taken from the under side of the litter.

Figure 6 is a plan view of a saddle used herein.

In the embodiment of the invention as disclosed in the drawing the litter is provided with closed in the drawing the litter is provided with poles 10 each of which is provided centrally with a joint 11 of a type which is foldable only in one direction. These poles are provided at their ends with handles 12. The usual fabric strip 13 connects the poles 10, being provided with tubular side portions 14 to receive the poles. This fabric is cut away as at 15 to provide clearance for the joints 11.

Screwed or otherwise secured to the under side of each pole adjacent the handle portions thereof is a pair of saddles 16. On each of these saddles is mounted a swivelling block 17 having a pin 18 connected to the saddle whereon it is mounted. This pin 18 may be either a screw, rivet or other suitable means. Extending from end to end of each block is a bore wherethrough passes a bolt 20 which projects at each end beyond the block 17. On each bolt 20 is mounted a stirrup-like leg 21, the arms of the leg being mounted on respective ends of the bolt. Each leg 21 has one arm provided with a flat end face 22 which, when the block 17 is turned to lie lengthwise of the saddle 16, rests on the flat face 23 of said saddle so that the leg cannot rotate on the bolt 20. However, the block 17, when turned to extend across the saddle 16, is of sufficient length to support the saddle legs (as shown in Figure 1) free of the saddle so that the leg may be turned down as in Figures 1 and 2.

In order to make provision for automatically shifting the position of the blocks 17 as the litter is collapsed and opened, each block 17 has pivoted thereto one end of a stretcher bar consisting of a pair of sections 24. These sections are connected centrally of the bar by a pivot 25, and one of these sections is provided with a square end 26 while the other section has a shoulder 27 against which the square end 26 engages when the litter is expanded thus preventing accidental collapse.

It is to be observed that the saddle 23 is of less width at the portion whereon the stirrup 21 folds as indicated at 28 while at its opposite ends the saddle is provided with a projecting portion 29 separated from the portion 28 by the notch 30. Now the width of the saddle at the portion 28 is such as to permit the folding downward, as shown in Figure 1, of the leg 21 substantially against the respective pole 10. The projection at 29 of the saddle is such that when the leg 21 is folded downwardly, as in Figure 1, the lower corner of this leg, adjacent the notch 30, will lie below the top surface 23 of the saddle. The bolt 20 is off-set from the center line of the leg 21 to permit the lower edge of one of these legs, as 31, to project downwardly in such position that, upon swinging of the block 17 in expansion of the litter the lower corner of the leg 31 will engage against the projecting portion 29 of the saddle and thereby cause tilting of the leg 21 into a right angled position with respect to said saddle.

The other side of the leg is shown at 32 and on this side the corner of the leg is rounded as at 33 so as to permit easy operation of the leg 21 when the litter is opened. This side of the leg is pivoted on the bolt 20 so that it is above the surface 23 of the saddle and consequently does not interfere with the swivelling of the block 17.

Now under these circumstances it will be observed from Figure 1 that the leg 21 has a corner 34 which, upon shifting of the block 17 from the position shown in Figure 1 to that shown in Figure 3, will contact with the projecting portion 29 of the saddle and thereby the leg 21 will be moved to an erect position at right angles to the saddle 16. In this position the flat portion of the leg 21, indicated at 22, will contact with the upper face of the saddle 23 and be held thereby at right angles to such saddle.

In the form of the invention shown in Figure 4 there is provided a biasing torsion spring 35 which tends at all times to move the leg 21 into parallelism with the pole 10 carrying the respective leg. However the movement of the separation of the poles 10 will effect movement of the legs 21 against the action of said springs.

Thus whenever the poles 10 are spread apart to set up the litter the legs 21 will be automatically moved into litter supporting position, while in the form shown in Figure 4 spring 35 will automatically effect folding of the legs 21 against the poles 10.

In accordance with the foregoing and referring especially to Figure 1 it will be seen that upon spreading of the poles 10 the corners 34 of the respective legs will engage against the projecting portions 29 of the saddles, whereby the legs 21 will be, as shown in Figure 2, tilted upwardly or at right angles to the poles 10.

Further spreading movement of the poles 10 will cause the squared end portions of the legs 21 to engage the flat upper surfaces of the saddles 23 so that these legs will be prevented from collapsing. With special reference to Figure 4 it will be seen that the spring 35 of each leg constantly tends to swing this leg on the bolt 20 into its collapsed position against the respective poles 10. Therefore when the poles 10 are moved toward each other the spring 35 acts to effect folding of the legs 21 against such poles.

It will be obvious that the bar sections 24 act, when the litter is expanded by moving the poles 10 apart, to cause rotation of the blocks 17 and thereby move these blocks and the legs 21 pivoted thereto into and out of litter supporting position.

What I claim is:

1. In a folding litter a pair of side poles, a fabric connecting said side poles, a pair of saddles on each side pole, swivelling blocks each mounted on a respective saddle, legs pivoted to said swivelling blocks, co-operative means between each leg and its saddle whereby swivelling of the block on the saddle will cause erection of said leg, other co-operating means associated with each leg and its saddle and arranged to resist folding of the leg in one direction from erect position, and stretcher bars connecting the blocks of one pole with the blocks of the other and arranged to cause swivelling of said blocks as the poles are moved toward and from each other.

2. In a folding litter a pair of side poles, a fabric connecting said side poles, a pair of saddles on each side pole, swivelling blocks each mounted on a respective saddle, legs pivoted to said swivelling blocks and co-operative means between each leg and its saddle whereby swivelling of the block on the saddle will cause erection of said leg, other means whereby swivelling of the blocks in the opposite direction will effect movement of the legs into substantial parallelism with the poles and stretcher bars connecting the blocks of one pole with the blocks of the other and arranged to cause swivelling of said blocks as the poles are moved toward and from each other.

3. A leg structure for collapsing litters having a pair of side poles and a fabric connecting the same, said leg structure comprising a saddle fixed on the under side of a pole, a swiveling block pivoted on said saddle, a bolt extending longitudinally through said swiveling block, a leg having arms pivoted on said bolt, said leg having its arms of such width as to fold over the saddle upon the swiveling block moving to extend transversely thereof, said saddle having means for engagement with an arm of the leg upon movement of the block in one direction whereby to move the leg into litter supporting position, and means to effect swiveling of the block upon spreading of the poles from each other.

4. A leg structure for collapsing litters having a pair of side poles and a fabric connecting the same, said leg structure comprising a saddle fixed on the under side of a pole, a swiveling block pivoted on said saddle, a bolt extending longitudinally through said swiveling block, a leg having arms pivoted on said bolt, said leg having its arms of such width as to fold over the saddle upon the swiveling block moving to extend transversely thereof, said saddle having means for engagement with a arm of the leg upon movement of the block in one direction whereby to move the leg into litter supporting position, means to effect swiveling of the block upon spreading of the poles from each other, and a spring urging said leg into housing position and operable upon collapse of the litter.

5. In a collapsible litter including a pair of poles and a fabric connection between said poles, elongated saddles secured to the under side of said poles, an elongated swivel block pivoted on each saddle and having a length at least as great as the transverse dimensions of the saddle, a leg having a pair of arms pivotally connected to opposite ends of said block, the end of one of said arms being flat and resting on the lower face of the saddle upon the block being in position longitudinally of the saddle, means for swivelling said blocks on said saddles upon collapsing and expanding movement of said litter, and co-operating means on each leg and its saddle engaging upon swivelling of the blocks and moving the legs from folded to erect position.

6. In a collapsible litter including a pair of poles and a fabric connection between said poles, elongated saddles secured to the under side of said poles, an elongated swivel block pivoted on each saddle and having a length at least as great as the transverse dimension of the saddle, a leg having a pair o farms pivotally connected to opposite ends of said block, the end of one of said arms being flat and resting on the lower face of the saddle upon the block being in position longitudinally of the saddle, jointed litter rods each having its ends connected to a pair of said swivel blocks and acting to swing said swivel blocks on their pivots as the litter is moved between expanded and collapsed positions, and co-operating means on each leg and its saddle engaging upon swivelling of the blocks and moving the legs from folded to erect position.

7. In a collapsible litter including a pair of poles and a fabric connection between said poles, elongated saddles secured to the under side of said poles, an elongated swivel block pivoted on each saddle and having a length at least as great as the transverse dimensions of the saddle, a leg having a pair of arms pivotally connected to opposite ends of said block, the end of one of said arms being flat and resting on the lower face of the saddle upon the block being in position longitudinally of the saddle, said pivot blocks being of less length than said saddles, and means to swing said swivel blocks on their pivots as the litter is moved between expanded and collapsed positions, and co-operating means on each leg and its saddle engaging upon swivelling of the blocks and moving the legs from folded to erect position.

8. In a collapsible litter including a pair of poles and a fabric connection between said poles, elongated saddles secured to the under side of said poles, an elongated swivel block pivoted on each of said saddles and having a length at least as great as the transverse dimension of the saddle, a leg having a pair of arms pivotally connected to opposite ends of said block, the end of one of said arms being flat and resting on the lower face of the saddle upon the block being in position longitudinally of the saddle, said pivot blocks being of less length than said saddles, means for swivelling said blocks on said saddles upon collapsing and expanding movement of said litter, and co-operating means on each leg and its saddle engaging upon swivelling of the blocks and moving the legs from folded to erect position.

9. In a collapsible litter including a pair of poles and a fabric connection between said poles, elongated saddles secured to the under side of said poles, an elongated swivel block pivoted on each saddle and having a length at least as great as the transverse dimension of the saddle, a leg having a pair of arms pivotally connected to opposite ends of said block, the ends of one of said arms being flat and resting on the lower face of the saddle upon the block being in position longitudinally of the saddle, said pivot blocks being of less length than said saddles, jointed stretcher rods each having its ends connected to a pair of said swivel blocks and acting to swing said swivel blocks on their pivots as the litter is moved between expanded and collapsed position, and co-operating means on each leg and its saddle engaging upon swivelling of the blocks and moving the legs from folded to erect position.

JOE J. ETTINGER.